Aug. 16, 1932.  F. M. BARTELME  1,871,771
GEAR SHIFTING MECHANISM
Filed July 24, 1925  9 Sheets-Sheet 2
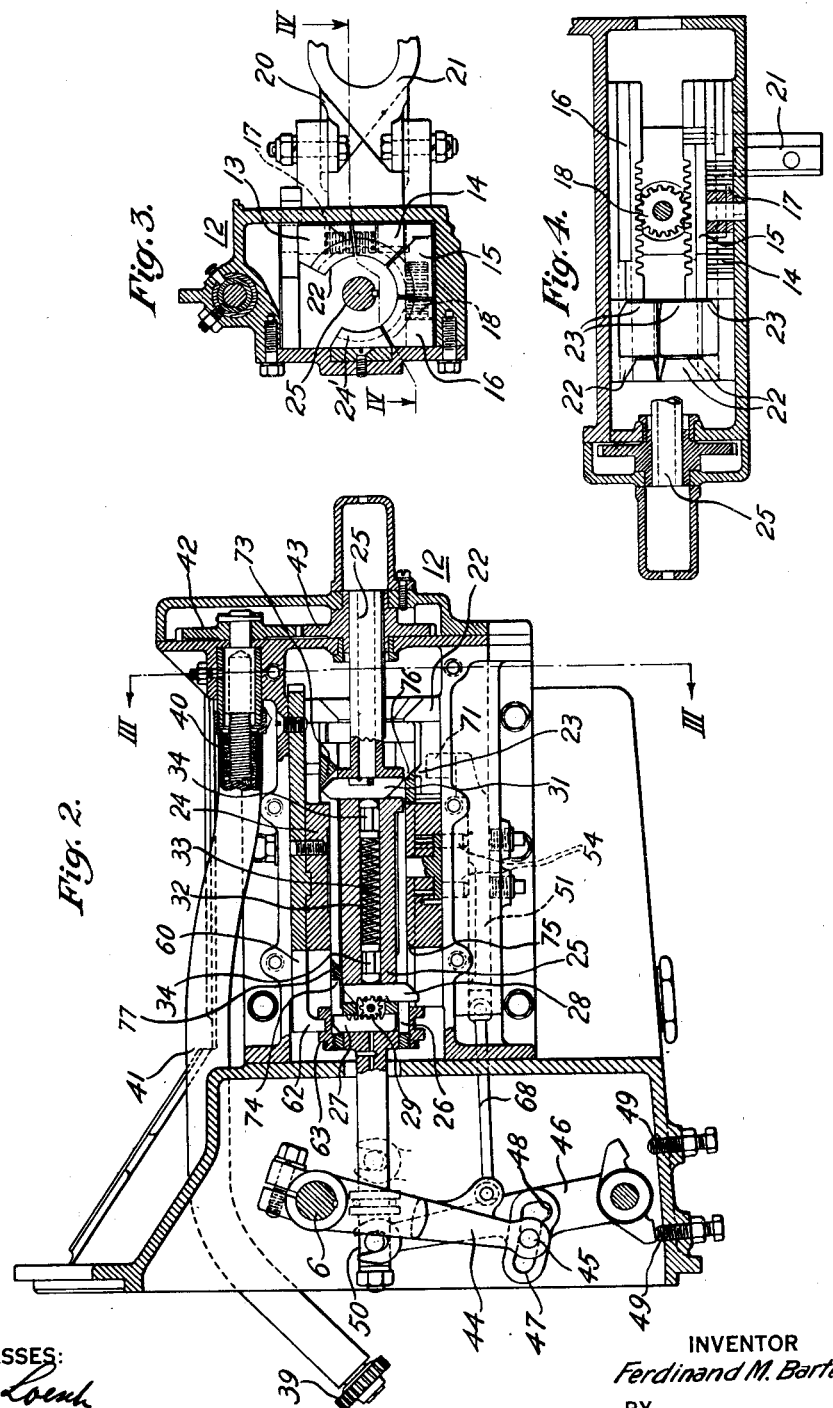
INVENTOR
Ferdinand M. Bartelme Aug. 16, 1932.  F. M. BARTELME  1,871,771
GEAR SHIFTING MECHANISM
Filed July 24, 1925  9 Sheets-Sheet 3

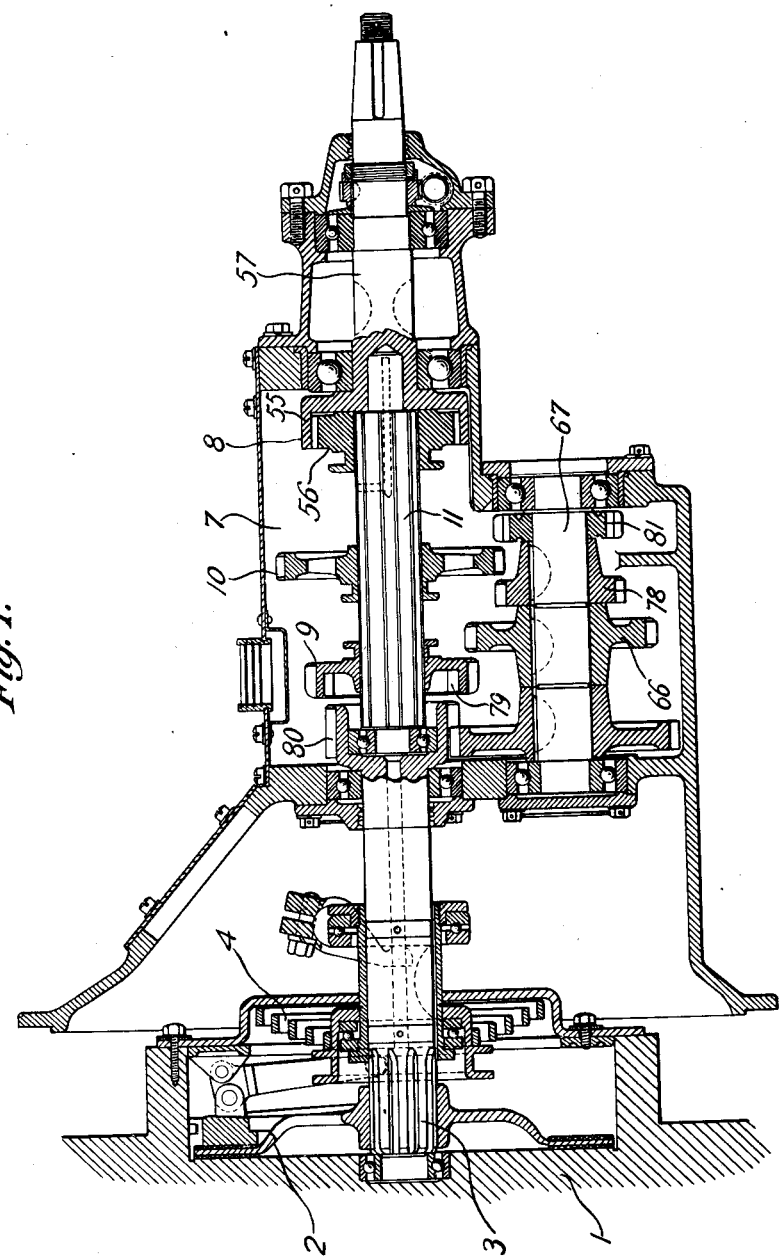

INVENTOR
Ferdinand M. Bartelme
BY
Wesley G. Carr
ATTORNEY

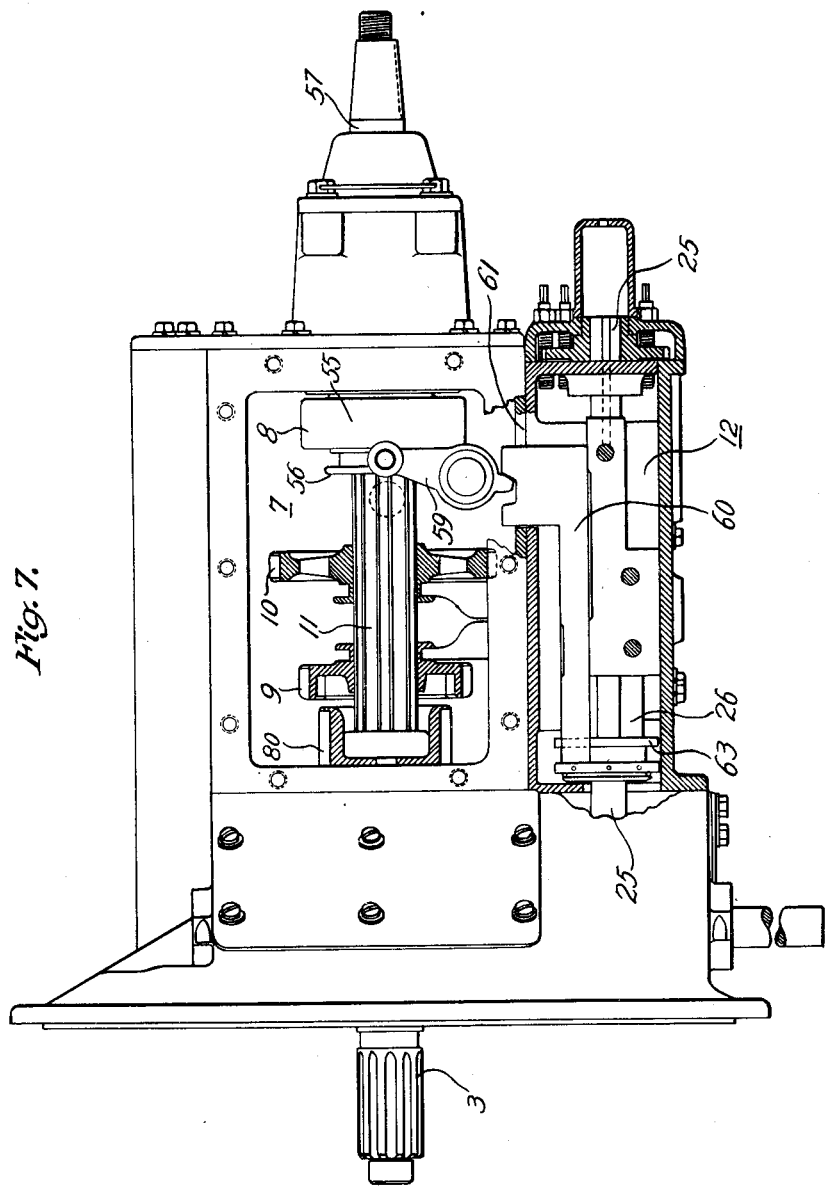

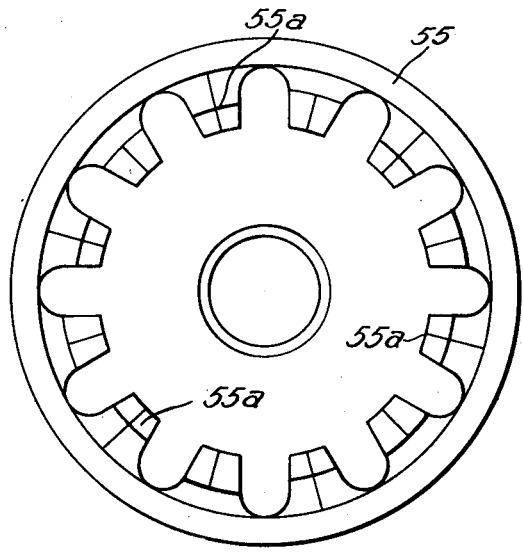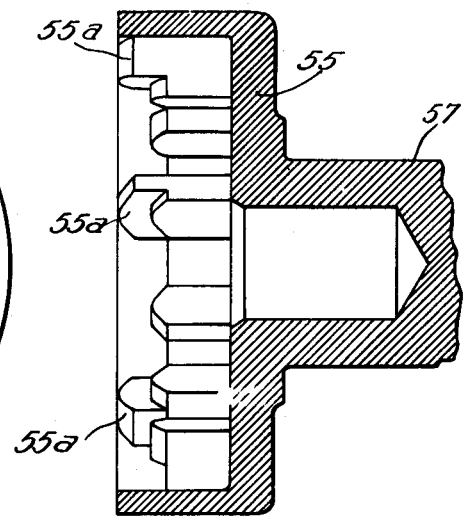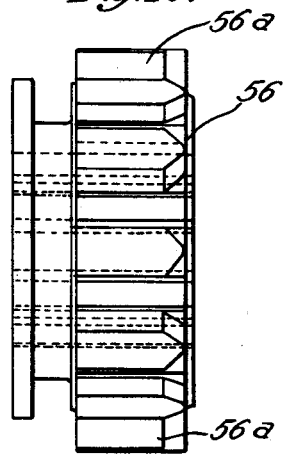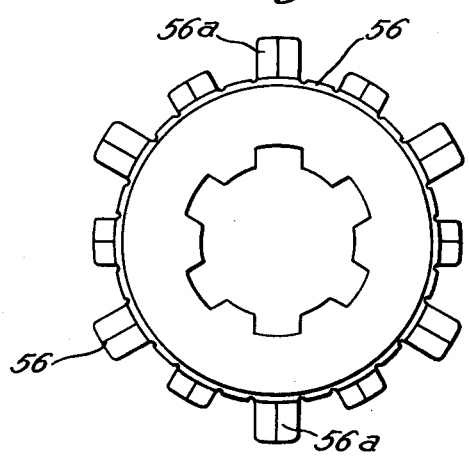

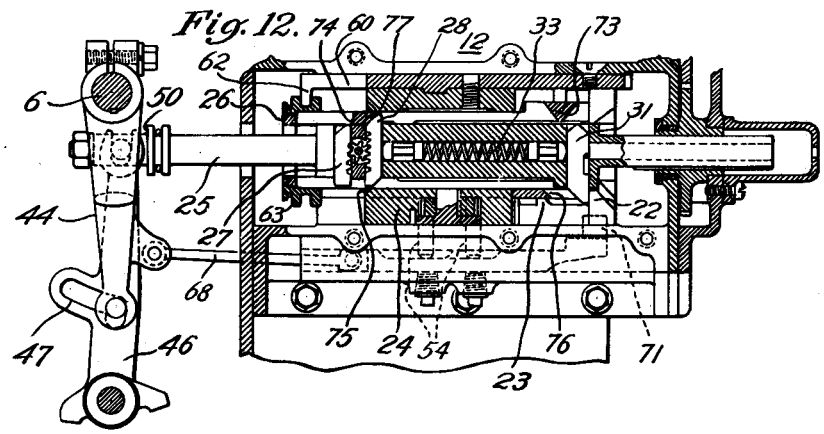
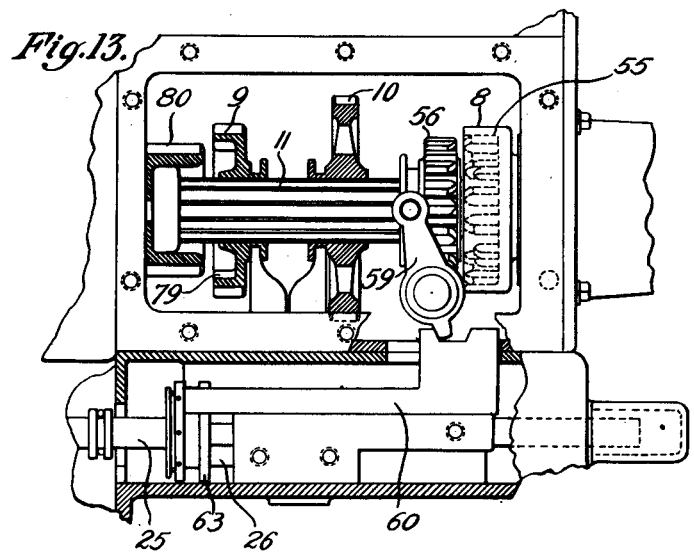
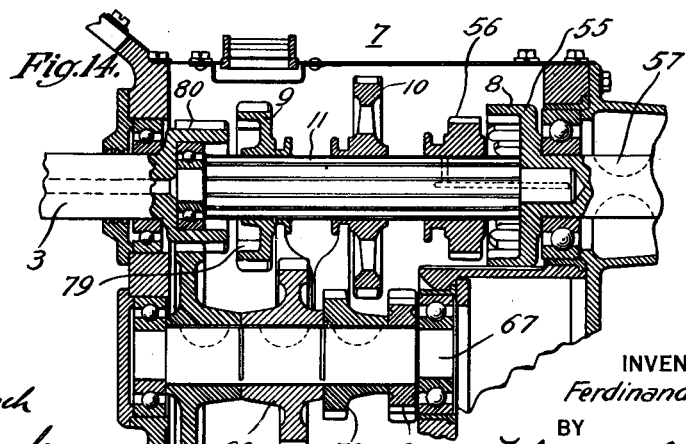

Aug. 16, 1932.                F. M. BARTELME                1,871,771
                          GEAR SHIFTING MECHANISM
                            Filed July 24, 1925          9 Sheets-Sheet 7
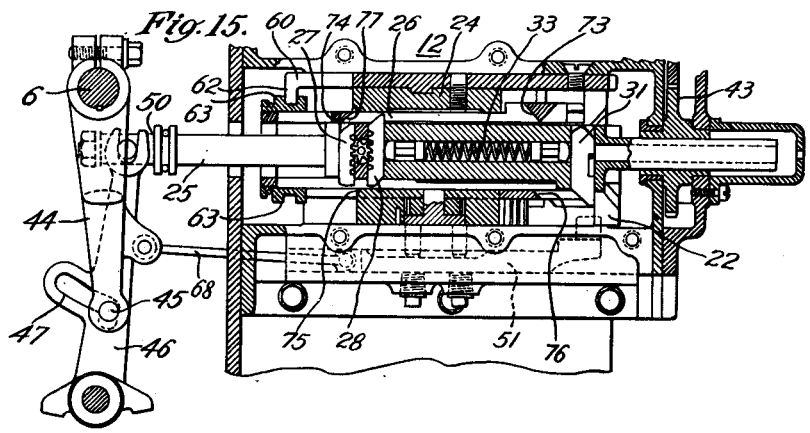
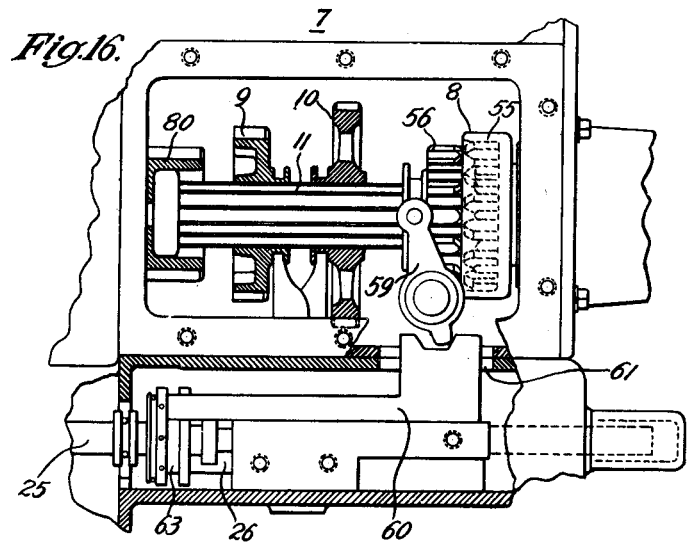
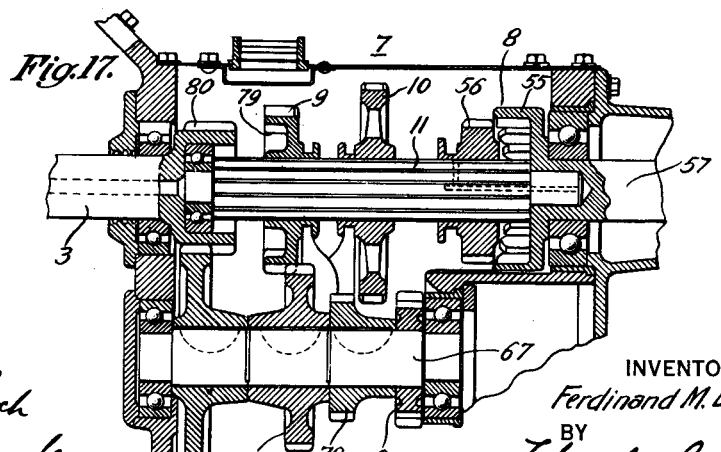
WITNESSES:                                          INVENTOR
                                                 Ferdinand M. Bartelme
                                              BY
                                                     ATTORNEY Aug. 16, 1932.　　　　F. M. BARTELME　　　　1,871,771
GEAR SHIFTING MECHANISM
Filed July 24, 1925　　　　9 Sheets-Sheet 8
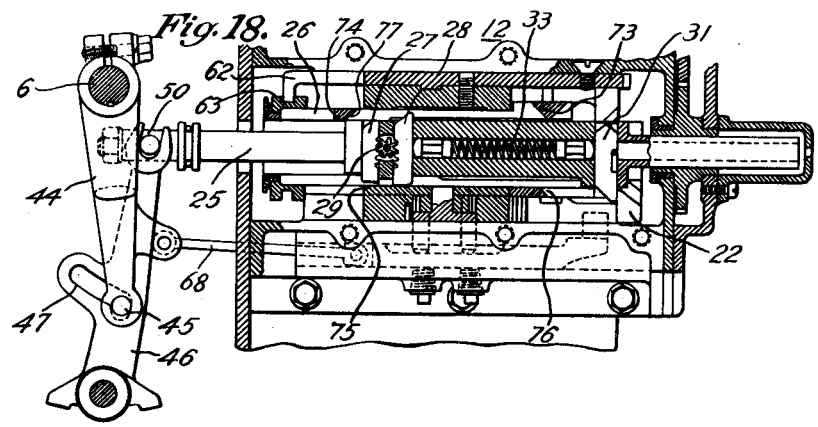
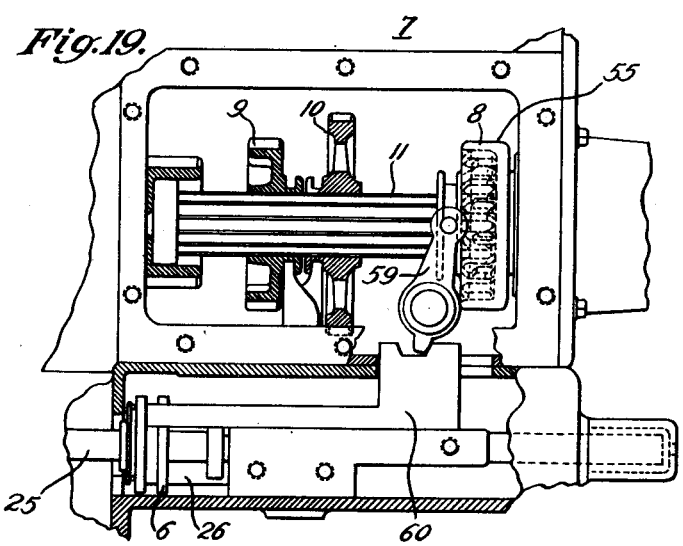
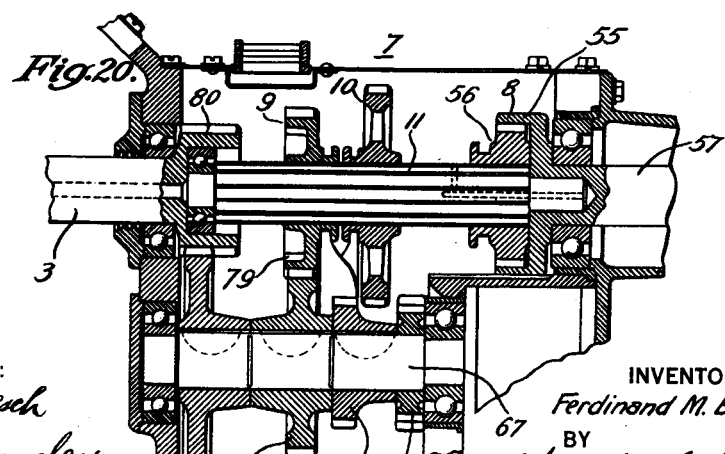
WITNESSES:
INVENTOR
Ferdinand M. Bartelme
BY
ATTORNEY

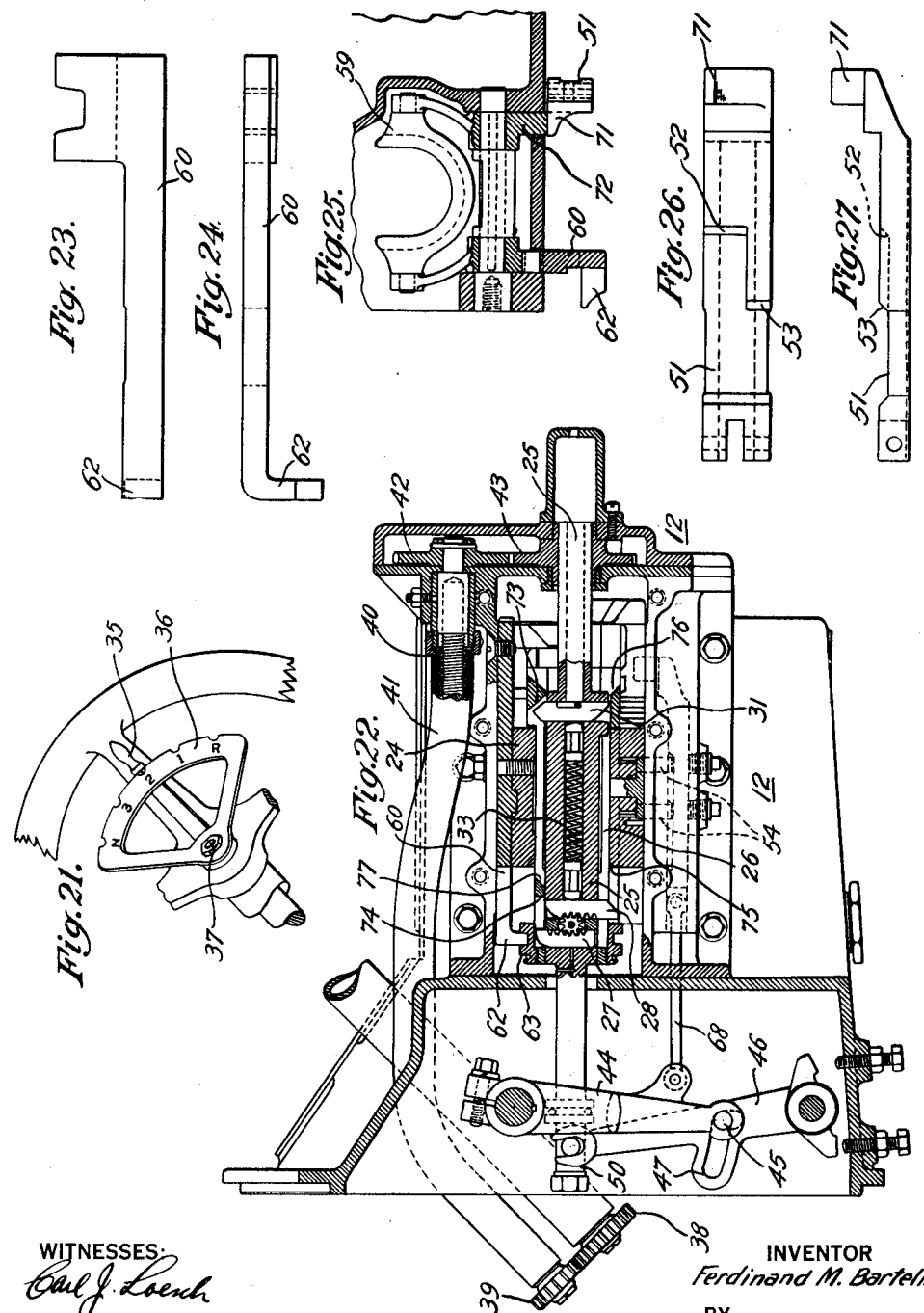

Patented Aug. 16, 1932

1,871,771

UNITED STATES PATENT OFFICE

FERDINAND M. BARTELME, OF CHICAGO, ILLINOIS

GEAR SHIFTING MECHANISM

Application filed July 24, 1925. Serial No. 45,751.

My invention relates to gear-shifting mechanisms, and it has particular relation to gear-shifting mechanisms of the preselective type that are applicable for use in connection with transmission mechanisms having main and auxiliary clutches for operative connection to the engine and to the driving wheels of a motor vehicle.

My invention has, for one of its objects, to provide a gear-shifting mechanism having a selector remotely disposed therefrom but which is so connected thereto that its accuracy is not affected by relative movements of the frame or transmission mechanism of an automobile and the steering wheel or other part upon which the selector may be located.

A second object of my invention is to provide means for interlocking the main clutch of a motor vehicle and a gear-shifting mechanism whereby it is impossible for the main clutch to occupy its engaged position unless the gear-shifting mechanism is in its neutral position or one of its operative positions.

Another object of my invention is to provide a mechanism for controlling the shiftable gear wheels of a transmission mechanism and the connection of the transmission mechanism to the engine and the driving wheels of a motor vehicle, the operating levers being located within the usual bell housing of a motor vehicle.

A further object of my invention is to provide means for positively locking the shifted gear wheel in its operative position while the main clutch is engaged.

A further object of my invention is to provide an auxiliary clutch for a transmission mechanism whereby the transmission mechanism may be connected to the driving wheels of a motor vehicle, irrespective of the relative speeds of the parts to be connected.

A further object of my invention is to provide means whereby, upon the positive, or forward, operation of the usual clutch pedal, the main clutch is disengaged, the auxiliary or rear clutch is disengaged and the latter is then again engaged.

A further object of my invention is to provide a unitary mechanism for controlling the shiftable gears of a transmission mechanism and the main and the auxiliary clutches associated therewith.

A further object of my invention is to provide a mechanism for controlling the shiftable gears of a transmission mechanism and the main and the auxiliary clutches therefor in such sequence that the speed ratio of the transmission mechanism may be changed regardless of the relative speed of the driving and the driven elements.

A further object of my invention is to provide a gear-shifting mechanism that is operable to shift a transmission mechanism to a preselected speed ratio while both the main and the rear clutches are disengaged, and to effect the engagement of the clutches in predetermined sequence.

A further object of my invention is to provide a gear-shifting mechanism having interlocking means whereby it is impossible for the main clutch to engage until the shifted gear wheel of the transmission mechanism and the rear clutch are fully engaged.

A further object of my invention is to provide means for automatically and positively locking the rear clutch of a transmission mechanism whereby it cannot be disengaged while the main clutch is engaged.

A further object of my invention is to provide an operating mechanism for a gear-shifting mechanism that is effective to successively disengage the main clutch, disengage a second clutch, actuate the gear-shifting mechanism, engage the second clutch, return the gear-shifting mechanism to normal condition and then engage the main clutch.

A further object of my invention is to provide a lost-motion connection between the main clutch and the gear-shifting mechanism, which permits the clutch to be disengaged prior to the actuation of the gear-shifting mechanism but which insures the return of the gear-shifting mechanism to its normal condition prior to the engagement of the clutch.

A still further object of my invention is to provide a lost-motion between the main clutch and the gear-shifting mechanism which permits the clutch to be disengaged prior to the actuation of the gear-shifting mechanism when the controlling member is actuated in one direction and which positively returns the gear-shifting mechanism to normal condition during the initial portion of the return movement of the controlling member.

In accordance with my invention, I provide a gear-shifting mechanism of the preselective type having a selector lever that is mounted on the steering wheel adjacent to the operator and that is connected to the gear-shifting mechanism by means of a relatively stiff coil spring that is readily flexible laterally but that is relatively rigid angularly. A cam mechanism interlocks the main clutch of the vehicle to the gear-shifting mechanism, whereby it is impossible for the main clutch to be engaged unless the gear-shifting mechanism is in either its neutral position or one of its operative positions. When the main clutch is engaged, the gear-shifting mechanism is positively locked in the position it occupies.

An auxiliary or rear clutch is disposed between the transmission mechanism and the propeller shaft of the vehicle whereby, when speed changes are effected, the entire transmission mechanism is disconnected from the engine and from the rear or driving wheels of the vehicle. The usual clutch pedal operates to control the gear-shifting mechanism and the main and the auxiliary clutches in a predetermined sequence through a complete cycle.

The details of construction and the operation of my invention will be described in connection with the accompanying drawings, in which Figure 1 is a view, in longitudinal vertical section, of a transmission mechanism constructed in accordance with my invention and the associated main clutch of a motor vehicle;

Fig. 2 is a similar view of the gear-shifting mechanism and a portion of the operating mechanism therefor;

Fig. 3 is a view, in transverse section taken on line III—III of Fig. 2, of the gear-shifting mechanism;

Fig. 4 is a longitudinal sectional view of the gear-shifting mechanism illustrating certain of the details of the rack bars;

Fig. 7 is a top plan view of the transmission mechanism and the gear-shifting mechanism, parts of the casing being broken away;

Figs. 8, 9, 10 and 11 are elevational views of the details of the rear clutch;

Fig. 12 is a view, similar to Fig. 6, with the operating parts in a subsequent position;

Fig. 13 is a view, partially in elevation and partially in section, of a portion of the transmission mechanism with the rear clutch disengaged and corresponding to the position of the mechanism of Fig. 12;

Fig. 14 is a view, in longitudinal section, of the transmission mechanism with the rear clutch disengaged as in Fig. 13;

Fig. 15 is a view, similar to Fig. 12, with the operating mechanism in a subsequent position in the cycle;

Fig. 16 is a view, partially in elevation and partially in section, of a portion of the transmission mechanism, the rear clutch being almost in engagement corresponding with the position of the parts in Fig. 15;

Fig. 17 is a longitudinal sectional view of the transmission mechanism, with the rear clutch in a position corresponding to that illustrated in Fig. 16, and one pair of gear wheels partially in mesh;

Fig. 18 illustrates the gear-shifting mechanism in the position corresponding to the engaged position of the rear clutch;

Fig. 19 is a view, partially in elevation and partially in section, of a portion of the transmission mechanism with the rear clutch fully engaged to correspond to the position of the parts of Fig. 18;

Fig. 20 is a longitudinal sectional view of the transmission mechanism, with the rear clutch fully engaged and the transmission mechanism as arranged for operation at second speed;

Fig. 21 is a perspective view of a portion of the steering wheel of an automobile with a selector mechanism mounted thereon;

Fig. 22 is a view, in longitudinal vertical section of the gear-shifting mechanism with the parts in normal position, the operating levers therefor corresponding to the open position of the main clutch;

Figs. 23 and 24 are views, respectively in side elevation and top plan, of the member for actuating the rear clutch;

Fig. 25 is a view, partially in elevation and partially in section, of the yoke member for operating the main clutch and members operatively associated therewith; and Figs. 26 and 27 are respectively top plan and side elevational views of the cam bar constituting a part of the interlocking mechanism between the main clutch and the gear-shifting mechanism.

Figure 5:
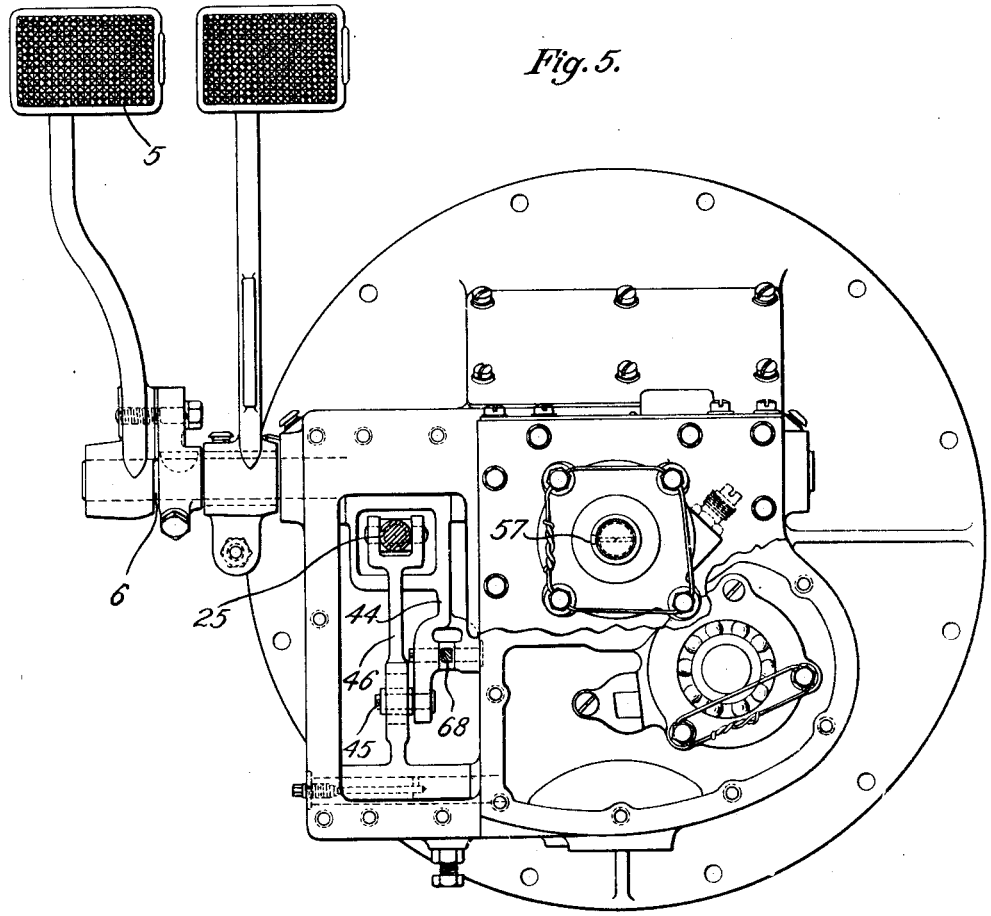
Fig. 5 is a rear end view of the enclosed gear-shifting mechanism and transmission mechanism, a portion of the housing being broken away to disclose certain details therein.

Referring particularly to Fig. 1, the fly wheel 1 of an automobile engine (not shown) is provided with a main clutch comprising a movable member 2 that is arranged for movement along the usual spline shaft 3 and that is biased toward its engaged position by a coil spring 4. The main clutch is controlled by the usual clutch pedal 5 (Fig. 5) that is mounted on a transverse rock shaft 6 and that is connected to the clutch member 2 through the usual link-and-lever mechanism. The clutch member 2 is operatively connected by means of the spline shaft 3 to the transmission mechanism 7.

The transmission mechanism 7 differs from the usual transmission mechanism of the sliding gear type only in that it is provided with a rear clutch 8, the details of which will be later described. The transmission mechanism comprises two shiftable gear wheels 9 and 10 that are splined on the transmission shaft 11 and the positions of which are controlled by a gear-shifting mechanism 12 that is operatively connected to the clutch pedal 5.

The gear-shifting mechanism 12 is similar, in principle and certain details of construction, to that shown and described in my copending application, Serial No. 520,913, filed Dec. 8, 1921. As best shown in Fig. 7, the gear-shifting mechanism 12 is closely adjacent to the transmission mechanism 7 at the side of the latter. The gear-shifting mechanism comprises two pairs of slidable rack bars 13 and 14 and 15 and 16, the members of the respective pairs of bars being operatively connected by pinions 17 and 18 for simultaneous movement in opposite directions.

The rack bar 13 is connected to the shiftable gear wheel 10 by means of a horizontally projecting yoke 20. The rack bar 15 is connected to the gear wheel 9 by a similar yoke 21. Each of the rack bars is provided with two projecting portions or dogs 22 and 23, the inner surfaces of which are normal to the axis of the corresponding bars, and the outer surfaces of which are inclined thereto. The contours of the dogs 22 and 23 are such that their ends constitute arcs of a circle. As shown in Fig. 3, the outer dogs 22, together with a stationary dog 24', form a portion of a circle. The bars 13, 14, 15 and 16 correspond respectively to reverse, first, second and third speeds.

The positions of the members of the respective pairs of rack bars are controlled by an actuating mechanism mounted within a stationary guide member 24 comprising a longitudinally slidable and rotatable rod 25 and a hollow cylinder or sleeve 26 that surrounds the rod and that is movable therewith or in opposite directions thereon, in accordance with certain conditions. At the forward end of the actuating mechanism, the rod 25 is provided with a transverse slot in which are located two latch members 27 and 28 that are provided with gear teeth and are connected by a small pinion 29 for insuring simultaneous movement in opposite directions.

The sleeve 26 is provided with longitudinal slots for permitting transverse movement of the latch members to connect the sleeve and the rod or to permit relative movement therebetween. The rear end of the rod 25 is provided with a third latch member 31 that is arranged for transverse movement in corresponding slots in the rod 25 and cylindrical member 26. The latches 27, 28 and 31 insure that the rod 25 and the sleeve 26 move together angularly. The rod 25 is provided with an axially-extending bore 32, within which is located a spring 33 having a plunger 34 at each end thereof for yieldingly retaining the latches in any position to which they may be actuated.

The angular position of the rod 25 and sleeve 26 are controlled by the selector device located on the steering wheel of the automobile, as clearly shown in Figs. 21 and 22. The selector mechanism comprises a selector lever 35 which co-operates with a sector 36, bearing suitable legends R, 1, 2, 3 and N, that are adjacent to corresponding notches in the sector and refer, respectively, to reverse, first, second and third speeds and neutral position. The legends indicate the various positions of the gear-shifting mechanism for securing the corresponding position of the transmission mechanism.

The selector lever 35 is connected to the rod 25 by means of a rod 37 that extends through the steering column of the automobile, a pair of gear wheels 38 and 39 and a relatively stiff coil spring 40 that is readily flexible laterally but which is relatively rigid angularly. The spring 40 is enclosed by a suitable flexible casing 41. A gear wheel 42, that is connected to the inner end of the spring, meshes with a gear wheel 43 that is slidably keyed on the end of the rod 25. By means of the mechanism just described, the angular positions of the rod 25, the sleeve 26 and the latches 27, 28 and 31 may be adjusted for coaction of the latch 31 with the corresponding dogs of the rack bars.

The longitudinal position of the actuating mechanism comprising the rod 25 is controlled by the clutch pedal 5 and the shaft 6 through an arm 44 having a pin 45 that is connected to a pivoted lever 46 by means of an arcuate slot 47 having an offset portion 48 therein. The lever 46 is directly connected to the rod 25 and coacts with adjustable stop members 49. The axes about which the arm 44 and lever 46 are rocked are so arranged that the clutch pedal 5 and the shaft 6 may be operated to disengage the main clutch without actuating the lever 46. A trunnion 50 rotatably mounted on the rod 25 permits angular movement of the latter relatively to the lever 46.

However, if the clutch pedal is actuated beyond the position disengaging the main clutch, the arm 44 actuates the lever 46 to the right, as viewed in Fig. 2, and the pin 45 remains in the offset portion 48 of the slot so long as the clutch pedal remains beyond the position in which the main clutch is disengaged. This arrangement insures that the actuating mechanism of the gear-shifting mechanism cannot remain in an intermediate position when the main clutch is engaged, since the lever 46 must always be returned to its normal position prior to the engagement of the main clutch.

The clutch pedal 5 is interlocked with the gear-shifting mechanism 12 in such manner that the gear-shifting mechanism must be in the one or the other of its fully operative positions before the main clutch can be engaged. This mechanism comprises a reciprocable bar 51, shown in detail in Figs. 26 and 27, and that is operatively connected to the arm 44. The bar 51 has cam surfaces 52 and 53 which coact, respectively, with two slidable rods, or poppets 54, that engage suitable notches in the rack bars 14 and 15 when the latter are in either their respective neutral positions or fully operative positions.

It will be apparent, therefore, that the arm 44 and the bar 51 cannot occupy positions corresponding to the engagement of the clutch unless both poppets 54 have entered the recesses corresponding to the positions referred to above. It is also obvious that the gear-shifting mechanism is positively locked and cannot be operated accidentally or otherwise to shift the gears 9 and 10 unless and until the pedal has been previously actuated to disengage the main clutch.

The rear clutch 8, which appears, for example, in Figs. 7, 13 and 16, and which is shown in detail in Figs. 8, 9, 10 and 11, comprises two telescoping members 55 and 56 that are provided with coacting teeth. The outer member 55, which is connected to the propeller shaft (not shown), by means of a short shaft 57 is provided with inwardly projecting chamfered teeth, certain of which are provided with axially-extending projecting portions 55a. The inner member 56 is splined on the transmission shaft 11 and is provided with peripheral chamfered teeth, certain of which designated 56a are longer radially than the others.

The provision of the projecting portions for co-acting with the longer teeth enables the clutch members to be engaged when their relative speed is high as the initial effect is that of meshing gears of relatively few teeth that are widely spaced. The preliminary engagement occurs between these coacting members and, the clutch members are thereby synchronized. Their complete engagement is a simple matter. The number of projections relative to the number of teeth may be varied as desired as may the relative number of radially longer teeth. Also the character of the teeth on the respective clutch members may be transposed.

As clearly shown in Figs. 7, 13, and 16, the movable clutch member 56 is controlled by a yoke 59 that is actuated by a notched bar 60. The bar 60, which extends through an opening 61 in the wall of the transmission casing, is provided with a projection 62, Figs. 23 and 24, which engages a grooved ring 63 that is secured to the forward end of the sleeve 26.

In general, the sequence of operation is as follows: When the clutch pedal is actuated forwardly beyond the position at which the main clutch is disengaged, the cam bar 51 is disengaged from the poppets 54 and the rear clutch is unlocked. Further actuation of the clutch pedal shifts the engaged shiftable gear wheel toward its neutral position, and the disengagement of the rear clutch is initiated. The shifted gear wheel is then brought to neutral position and the rear clutch is entirely disengaged. The selected shiftable gear wheel is next moved from its neutral position to partial engagement with the proper gear on the countershaft, and the rear clutch is then initially engaged. The selected gear wheel is next shifted into fully engaged position, and the rear clutch is fully engaged substantially simultaneously. Upon the return movement of the clutch pedal, the gear-shifting mechanism is restored to normal position and subsequently the poppets are locked in position and the rear clutch is also locked in its engaged position and, finally, the main clutch is engaged.

A detailed description of the operation of the gear-shifting mechanism and its associated parts will follow. It may be assumed that the transmission mechanism and the arm 44 are in their respective neutral positions, as indicated in Fig. 2, in which case the shiftable gear wheels 9 and 10 are not engaged with any of the coacting gear wheels, as illustrated in Fig. 1. It may be assumed further that it is desired to operate at second speed, in which case it is necessary to shift the gear wheel 9 into mesh with a gear wheel 66 that is mounted on the counter-shaft 67 of the transmission mechanism.

Before the shift is made, the selector lever 35 is adjusted to the position shown in Fig. 21, in which it is adjacent to the legend 2 on the sector 36. The movement of the selector lever 35 operates through a rod 37, gear wheels 38 and 39, spring 40 and gear wheels 42 and 43 to rotate the rod 25 and the cylinder 26 into such angular position that the latch 31 is in alinement with the rack bar 15. The change in speed may now be effected at any desired subsequent time. It is not necessary for the operator to hold the lever 35 in its adjusted position, since suitable accentuating mechanism of any usual type may be employed to coact with the notches in the sector 36 for that purpose.

When it is desired to shift into second speed, the clutch pedal is actuated forwardly and the movable member 2 of the main clutch is released from the fly wheel 1 in the usual manner. When the main clutch is fully disengaged, the arm 44 has moved the pin 45 from its normal position in the slot 47 to the right-hand end of the arcuate portion of the slot.

It will be observed that the normal operation of the clutch pedal to disengage and engage the main clutch may occur without affecting the position of the gear-shifting mechanism and its associated parts, the slot 47 and the pin 45 constituting a lost-motion connection between the clutch pedal and the gear-shifting mechanism.

The pin 45 now engages the lever 46 and further forward movement of the clutch pedal causes a corresponding movement of the latter. When the clutch pedal is actuated beyond the clutch-disengaging position, the arm 44 has operated through a link 68 to actuate the cam bar 51 to the right to release the poppets 54 and thus permit subsequent movement of the gear-shifting mechanism. At the same time, a projection 71 in the bar 51 moves out of engagement with a member 72 of the yoke 59 to permit the latter to operate the rear clutch. The release of the poppets 54 and the unlocking of the yoke 59 by the bar 51 must precede any change in position of the rack bars for controlling the speed ratio of the transmission mechanism. During the releasing and unlocking operation, the rod 25 has been moved to the right by the lever 46, but the movement of the rod 25 has not effected any change in the positions of the sleeve 26 or of the several rack bars.

Figure 6:
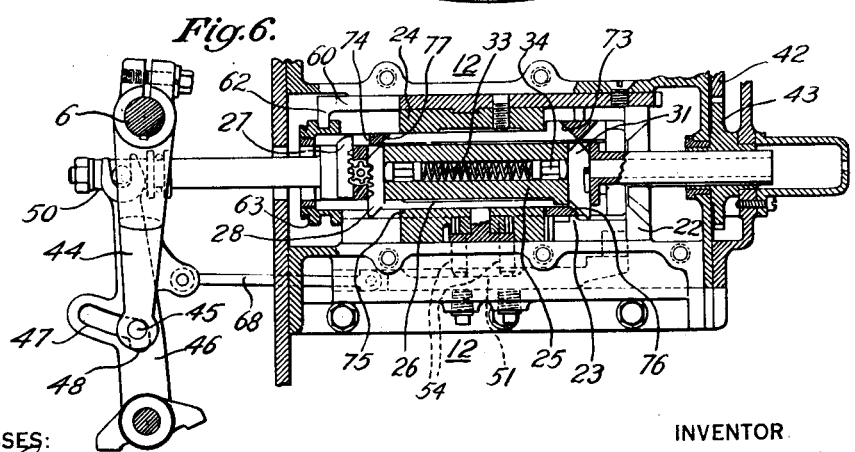
Fig. 6 is a view, in longitudinal section, of the gear-shifting mechanism with the operating parts in an intermediate position.

However, the latch 31, which normally occupies the position in which it is illustrated in Fig. 2, has engaged a cam member 73, which causes the latch 31 to be depressed and to assume the position in which it is illustrated in Fig. 6. The latch 27 has moved toward a shoulder 74 which it subsequently engages to actuate the sleeve 26.

When the parts are in the relative positions in which they are illustrated in Fig. 12, it will be noted that the latch 31 is in engagement with the dog 22 of rack bar 15 and that the latches 27 and 28 have respectively been actuated downwardly and upwardly by reason of the engagement of the latch 28 with a cam surface 75. The latch 27 has released the sleeve 26, which is now in its extreme rearward position, corresponding to the neutral positions of the rack bars.

The sleeve 26 and the connected bar 60 have operated through the yoke 59 to disengage the rear clutch, the parts of the latter occupying their relative positions shown in Fig. 13. The transmission mechanism occupies the corresponding position illustrated in Fig. 14.

Further actuation of the clutch pedal and the mechanism connected thereto, including the rod 25, causes the latch 31 to actuate the rack bar 15 to the right, as viewed in the drawings, and to move the latches 27 and 28 to their positions illustrated in Fig. 15.

The movement of the bar 15 to the right is accompanied by a corresponding movement of the bar 16 in the opposite direction. The dog 22 of the forwardly moving bar 16 actuates the sleeve 26 and the bar 60 to the left. The notch in the bar 60 constitutes a lost-motion connection between the latter and the yoke 59, whereby considerable movement of the sleeve 26 in its return to normal position is permitted without affecting the position of the rear clutch.

The initial movement of the rack 15 has shifted the gear wheel 9 to the right, and when the parts are in the positions corresponding to those illustrated in Figs. 15 and 16, the gear 9 is partially in mesh with the gear 66 on the countershaft.

When the clutch pedal has reached the limit of its forward movement, the gear-shifting mechanism is in the position illustrated in Fig. 18. It will be noted that the rod 25 and the rack bar 15 are at the extremities of their paths of movement and that the sleeve 26 has returned to its normal position.

By reference to Fig. 19, it will be noted that the return movement of the sleeve 26 and the bar 60 has effected the engagement of the rear clutch, subsequent, however, to the initial engagement of the gears 9 and 66.

As shown in Fig. 20, the gear 9 is now completely in mesh with the gear 66 and the transmission mechanism is connected for operation at second speed.

Upon release of the clutch pedal, the arm 44 effects the return of the lever 46 toward its normal position by reason of the fact that the pin 45 occupies the offset portion 48 of the slot 47 and cannot enter the arcuate portion of the slot 47 until the parts are in the position corresponding to the disengaged position of the main clutch. The cam bar 51 is returned by the arm 44 toward its extreme left-hand position to cause the poppets 54 to lock the rack bars in their respective positions and to lock the yoke 59 against movement to disengage the rear clutch.

The return movement of the lever 46 effects movement of the rod 25 to the left within the sleeve 26, whereupon the latch 31 engages the cam surface 76 to return the latch 31 to its uppermost position. The latch 28 is actuated downwarldy and the latch 27 is accordingly actuated upwardly when the latch 28 engages a cam surface 77. When the rod 25 and the sleeve 26 are in their normal relative positions, the parts occupy their several positions illustrated in Fig. 2.

In case it is desired to change to another speed ratio while the transmission mechanism is adjusted for second speed, the operation differs in no material respect from that described above, it being merely necessary to adjust the lever 35 to the corresponding position at any time while the vehicle is in operation and prior to the actual change. The movement of the sleeve 26 to the right, however, operates to return the rack 16 and the connected rack 15 to their normal positions by reason of the fact that the end of the sleeve 26 engages the dog 22 of the bar 16. The shifting of the bar 15 effects the return of the gear wheel 9 to its neutral position upon the initial actuation of the bar.

In case the clutch pedal is actuated during the operation of the transmission mechanism at any speed and prior to the selection of a different speed ratio, it is not possible to actuate the clutch pedal materially beyond its clutch-disengaging position for the reason that such movement is prevented by the engagement of the latch 31 with the dog 23 of the rack bar that has been shifted. For example, when the rack bar 15 occupies its extreme right-hand position, as illustrated in Fig. 18, the dog 23 occupies a position to the left of the position normally occupied by the dog 22 and further movement of the rack 15 to the right is not possible because the dog 22 of the rack 16 is held by the sleeve 26 and the latter is at the end of its path of movement. This principle of operation has been termed "selective neutralization" by reason of the fact that it is impossible to actuate any shifted gear wheel to neutral position unless a speed change has been previously selected.

When the transmission mechanism is operating at any of the several speed ratios, and it is desired to shift to neutral position, the selector lever is adjusted to the position indicated by N, whereupon the latch member 31 is in alinement with the stationary dog 24. This arrangement permits sufficient movement of the sleeve 26 to actuate any shifted gear wheel to its neutral position by reason of the coaction of the sleeve 26 with the dog 22 of any rack bar that is in a forward position. However, no movement of the connected parts beyond positions corresponding to the extreme rearward position of the sleeve 26 is permitted, since the latch 31 then engages the stationary dog 24.

When it is desired to operate at first speed, the selector lever is adjusted to the numeral 1 and the subsequent operation of the clutch pedal to actuate the gear-shifting mechanism operates the rack bar 14 to shift the gear wheel 10 into engagement with a coacting gear wheel 78 on the countershaft 67.

To operate at high speed, the rack bar 16 is operated to shift the gear wheel 9 to the left in order that internal teeth 79 may mesh with a gear wheel 80 that is located at the rear end of the spline shaft 3. For reverse operation, the gear wheel 10 is shifted by the rack bar 13 to the right, as viewed in the drawings, into mesh with an idler gear (not shown) that is directly connected to a gear wheel 81 on the countershaft 67.

It will be noted that I have provided a gear-shifting mechanism that is controlled by a selector mechanism comprising a member that is readily flexible laterally without changing the relative angular position of its respective ends. Consequently, any relative movements of the body of the vehicle and the chassis do not affect the accuracy of the adjustment of the selector lever.

It will be noted further that I have provided a unitary construction in which the gear-shifting mechanism and the transmission mechanism are all located adjacent to the bell housing of the power plant of a motor vehicle.

The main clutch and the gear-shifting mechanism are effectually interlocked in such manner that the main clutch must be disengaged before the gear-shifting mechanism may be actuated and whereby it is necessary that the gear-shifting mechanism be locked in one of its several operative positions before the main clutch may be engaged. It is impossible, therefore, for a shifted gear wheel to be disengaged unless and until the main clutch has been disengaged.

By means of the auxiliary or rear clutch and the arrangement whereby it may be operated by the same mechanism that controls the gear-shifting mechanism and the main clutch, it is possible to effect speed changes at any speed of the vehicle, since the speed of the engine and of the vehicle are not communicated to the transmission mechanism.

It will be noted that a single forward actuation of the clutch pedal operates to successively disengage the main clutch, disengage the rear clutch, effect the change in speed ratio of the transmission mechanism and engage the auxiliary clutch, the main clutch being engaged upon the release of the pedal. The provision of a unitary operating mechanism for the main and the rear clutches insures that they operate in proper sequence to effect any desired speed change upon a single movement of the operating mechanism.

The gear-shifting mechanism is pre-selective in that it may be operated at any time prior to the desired speed change to select the succeeding speed at which the transmission mechanism is to operate. The gear-shifting mechanism operates to shift from any speed ratio to any other desired speed ratio.

It is possible, also, not only to operate the selector lever at any time, but to effect a desired speed change, regardless of the position of the clutch pedal in its path of movement to control the main clutch or to operate the gear-shifting mechanism. Such operation is possible by reason of the arrangement of the dogs 22 in an arc of a circle with their inner faces in the same plane. The dogs 22 and the latch 31 are chamfered whereby it is impossible for the angular movement of the latch to be obstructed. In other words, the gear-shifting mechanism is capable of what may be termed "universal selection".

The provision of a positive lock for the rear clutch while the main clutch is engaged insures that the clutches operate in the proper sequence in shifting gears and that it is not possible for the rear clutch to be disengaged by accident, or otherwise, unless the main clutch is previously disengaged. The interlock between the main clutch and the gear-shifting mechanism, provided by the pin-and-slot connection therebetween, insures that the gear-shifting mechanism is always returned to normal position prior to the engagement of the main clutch.

The location of the operating levers for the gear-shifting mechanism in the usual bell housing is of particular advantage in that it permits their operation in planes that are parallel to each other and to the axes of movement of the actuating rod sleeve rack-bars and other reciprocating elements. This arrangement insures that there will be minimum tendency of the moving parts to bind against their guiding surfaces because of lateral components of their respective actuating forces.

The foregoing and other advantages will be apparent to those skilled in the art relating to gear-shifting mechanisms. Many changes may be made in the details of construction and operation of my invention and it is understood that my invention is not limited except as defined in the appended claims.

I claim as my invention:

1. The combination with a transmission mechanism and a main and an auxiliary clutch for respectively connecting the transmission mechanism to the driving and the driven elements of a motor vehicle, of means for positively locking said auxiliary clutch in engaged position while said main clutch is engaged.

2. The combination with a transmission mechanism and a main and an auxiliary clutch for respectively connecting the transmission mechanism to the driving and the driven elements of a motor vehicle, of means for positively locking said auxiliary clutch in engaged position while said main clutch is engaged, said means comprising a controlling member for said main clutch and a locking member controlled thereby.

3. The combination with a transmission mechanism and a main and an auxiliary clutch for respectively connecting the transmission mechanism to the driving and the driven elements of a motor vehicle, of means for positively locking said auxiliary clutch is engaged position while said main clutch is engaged, said means comprising a controlling member for said main clutch and a cam-controlled locking pin controlled thereby.

4. The combination with a transmission mechanism and a main and an auxiliary clutch for respectively connecting the transmission mechanism to the driving and the driven elements of a motor vehicle, of means for positively locking said auxiliary clutch in engaged position while said main clutch is engaged, said means comprising a pedal for controlling said main clutch, a cam member connected to said pedal and a locking pin controlled by said cam member.

5. The combination with a transmission mechanism having shiftable elements and a gear-shifting mechanism for controlling said shiftable elements, of two clutches for respectively connecting said transmission mechanism to driving and driven elements, controlling means for said clutches and means connected to said controlling means for positively locking one of said clutches and said gear-shifting mechanism in accordance with the position of the other clutch.

6. The combination with a transmission mechanism having shiftable elements and a gear-shifting mechanism for controlling said shiftable elements, of two clutches for respectively connecting said transmission mechanism to driving and driven elements, controlling means for said clutches and means comprising a cam member connected to said controlling means and a plurality of locking pins for positively locking one of said clutches and said gear-shifting mechanism in accordance with the position of the other clutch.

7. The combination with a transmission mechanism having shiftable elements and a gear-shifting mechanism for controlling said shiftable elements, of two clutches for respectively connecting said transmission mechanism to driving and driven elements, a lever for controlling said clutches and said gear-shifting mechanism, a cam member connected to said lever and locking pins controlled by said cam member and coacting with one of said clutches and said gear-shifting mechanism to lock them in position when the other clutch is in its engaged position.

8. The combination with a gear-shifting mechanism and a clutch, of operating means for said mechanism and said clutch comprising two members having pivotal supports and a lost-motion connection between said members, said lost-motion connection consisting of a slot in one of said members having an arcuate portion with said arm as a radius about its pivotal support as a center and having a second portion that extends at an angle with respect to the first portion.

9. The combination with a gear-shifting mechanism and a clutch, of operating means for said mechanism and said clutch comprising two members having spaced pivotal supports, one of said members having a slot with an offset portion and the other of said members coacting with said slot to provide a limited lost-motion connection between said members and to insure simultaneous movements of said members during a predetermined portion of the path of travel of one of said members.

In testimony whereof I have hereunto subscribed my name this 22nd day of July, 1925.

FERDINAND M. BARTELME